(12) United States Patent
Li et al.

(10) Patent No.: US 12,405,207 B2
(45) Date of Patent: Sep. 2, 2025

(54) SYSTEM AND METHOD FOR TESTING DURABILITY OF GAS DIFFUSION LAYER (GDL)

(71) Applicants: General Hydrogen Corp., Ltd., Shenzhen (CN); China Huadian Engineering Co., Ltd., Beijing (CN)

(72) Inventors: Zhengnan Li, Shenzhen (CN); Keguang Yao, Shenzhen (CN); Xin Wang, Shenzhen (CN); Jianming Bai, Shenzhen (CN); Gangping Peng, Beijing (CN)

(73) Assignees: General Hydrogen Corp., Ltd., Shenzhen (CN); China Huadian Engineering Co., Ltd., Beijing (CN)

( * ) Notice: Subject to any disclaimer, the term of this patent is extended or adjusted under 35 U.S.C. 154(b) by 0 days.

(21) Appl. No.: 18/963,619

(22) Filed: Nov. 28, 2024

(65) Prior Publication Data
US 2025/0116595 A1    Apr. 10, 2025

(30) Foreign Application Priority Data
May 23, 2024  (CN) .......................... 202410643655.4

(51) Int. Cl.
G01N 17/00    (2006.01)
(52) U.S. Cl.
CPC .................................. G01N 17/002 (2013.01)
(58) Field of Classification Search
CPC .................................................... G01N 17/002
See application file for complete search history.

(56) References Cited

U.S. PATENT DOCUMENTS

| 2011/0271742 A1* | 11/2011 | Park ...................... G01N 15/08 73/38 |
| 2011/0314928 A1* | 12/2011 | Hong ...................... G01N 3/20 73/849 |
| 2020/0020988 A1* | 1/2020 | Jung .................. H01M 8/04305 |

FOREIGN PATENT DOCUMENTS

| CN | 111122428 A | * | 5/2020 | ............. G01N 17/02 |
| CN | 216248261 U | * | 4/2022 | |
| CN | 219434639 U | * | 7/2023 | |
| CN | 117268869 A | * | 12/2023 | |
| CN | 117491272 A | | 2/2024 | |
| CN | 117929227 A | * | 4/2024 | |
| CN | 117996120 A | * | 5/2024 | |
| RU | 2772612 C1 | | 5/2022 | |

OTHER PUBLICATIONS

Machine translation of CN 117491272 (Year: 2024).*

* cited by examiner

*Primary Examiner* — Natalie Huls

(57) ABSTRACT

A system for testing durability of a gas diffusion layer (GDL) is provided, including a clamping component, a liquid storage tank and a peristaltic pump. The clamping component is configured to fix the GDL. The liquid storage tank is configured to store a corrosive liquid. The peristaltic pump is arranged between the clamping component and the liquid storage tank. The peristaltic pump is connected to the clamping component via a first pipeline, and is connected to the liquid storage tank via a second pipeline. A GDL durability testing method is also provided. During the testing, the corrosive liquid is pumped into the clamping component to perform erosion-corrosion on the GDL.

7 Claims, 6 Drawing Sheets

SYSTEM AND METHOD FOR TESTING DURABILITY OF GAS DIFFUSION LAYER (GDL)

CROSS-REFERENCE TO RELATED APPLICATIONS

This application claims the benefit of priority from Chinese Patent Application No. 202410643655.4, filed on May 23, 2024. The content of the aforementioned application, including any intervening amendments made thereto, is incorporated herein by reference in its entirety.

TECHNICAL FIELD

This application relates to fuel cells, and more particularly to a system and method for testing durability of a gas diffusion layer (GDL).

BACKGROUND

The gas diffusion layer (GDL) is an important component of the proton exchange membrane fuel cell (PEMFC), which is located between the flow field and the catalyst layer. It plays an important role in supporting the catalyst layer and collecting the current, and simultaneously provides multiple channels for gas, protons, electrons, and water to participate in the electrode reactions. Generally, the GDL is fabricated by coating a microporous layer (MPL) on a gas diffusion backing (GDB) composed of a porous carbon substrate, such as carbon cloth, carbon nonwoven fabric and carbon paper.

Under normal working conditions of the PEMFC, due to the simultaneous occurrence of chemical and physical changes and material transfer, the membrane electrode is required to be simultaneously responsible for the heat transfer, mass transfer, electrical conduction and structural support. Therefore, in addition to the evaluation of the maximum performance, the evaluation of durability is also crucial in the process of promoting the commercialization of PEMFC.

Traditional PEMFC durability test methods mostly focus on the proton conductivity of the proton exchange membrane (PEM) and catalyst attenuation, and less attention has been paid to changes in the GDL. Although the GDL attenuation will not directly cause the PEMFC failure, a highly-durable GDL is indispensable for the long-term stable operation of the PEMFC.

For the online testing of the PEMFC durability after the stack assembly, the testing results are often greatly affected by the PEM and catalyst. In this case, it is not easy to extract the GDL attenuation results from the online test results, making it difficult to accurately evaluate the GDL.

SUMMARY

An object of the disclosure is to provide a system and method for testing durability of a gas diffusion layer (GDL).

In order to achieve the above object, the following technical solutions are adopted.

In a first aspect, this application provides a system for testing durability of a GDL, comprising:
 a clamping component;
 a liquid storage tank; and
 a peristaltic pump;
 wherein the clamping component is configured to fix the GDL, a middle of the clamping component is provided with a flow channel, and both ends of the clamping component are channel-free;
 the liquid storage tank is configured to store a corrosive liquid;
 the peristaltic pump is arranged between the clamping component and the liquid storage tank; and the peristaltic pump is connected to the clamping component via a first pipeline, and is connected to the liquid storage tank via a second pipeline; and
 the peristaltic pump is configured to be turned on to pump the corrosive liquid from the liquid storage tank into the clamping component during testing, so as to perform erosion-corrosion on the GDL.

In some embodiments, the clamping component comprises a plurality of clamping plates arranged in parallel; and each of the plurality of clamping plates is provided with a water inlet and a water outlet; the water inlet is connected to the first pipeline, and the water outlet is connected to a third pipeline connected to the liquid storage tank; and the water inlet and the water outlet are configured such that the corrosive liquid enters the flow channel through the water inlet to perform the erosion-corrosion on the GDL, and flows back to the liquid storage tank through the water outlet.

In some embodiments, a front end of the water inlet is connected to a float-type flowmeter and a pulse valve in sequence, and the pulse valve is connected to the peristaltic pump.

In some embodiments, the plurality of clamping plates have the same size, and are each provided with a positioning hole at the same position; and the plurality of clamping plates are configured to be fixed via a screw passing through the positioning hole.

In some embodiments, the plurality of clamping plates includes a combination of at least two of a blind plate without flow channels on both sides, an end plate with one flow-channel side surface, and a middle plate with two flow-channel side surfaces.

In some embodiments, the GDL is located at a middle of the two adjacent clamping plates, and a gasket is provided around the GDL for sealing.

In some embodiments, a heating component is provided on an outer side of the clamping component.

In some embodiments, the corrosive liquid is selected from the group consisting of water, Fenton's reagent, ethanol, acetone, hydrogen peroxide, sulfuric acid, hydrochloric acid, nitric acid, sodium hydroxide and a combination thereof.

In some embodiments, the liquid storage tank comprises a blue-capped mobile phase bottle with a height of 100-300 mm.

In a second aspect, this application provides a method for testing GDL durability using the above system, comprising:
 (1) providing a plurality of GDLs, wherein the plurality of GDLs are identical to each other;
 (2) respectively clamping the plurality of GDLs between the plurality of clamping plates;
 (3) turning on the peristaltic pump to perform erosion-corrosion on the plurality of GDLs, and taking out N GDLs among the plurality of GDLs every M days; and
 (4) determining the physical and chemical parameters of the plurality of GDLs and an uncorroded GDL by using an analytical instrument.

Compared to the prior art, the present disclosure has the following beneficial effects.

The present disclosure can perform the offline GDL durability test under the corrosion of the corrosive liquid.

Compared with the conventional immersion, the system provided herein can simulate the influence of water and gas flushing in the flow channel of the cell stack and the corrosive liquid on a microporous layer (MPL) and a gas diffusion backing (GDB) layer in the GDL.

For the system of the present disclosure, the corrosive liquid (such as oxidizing solution, acidic solution, etc.) can be readily replaced. An appropriate combination of end plates, middle plates and blind plates can be adopted to clamp different numbers of samples and flush different surfaces of the samples. The gasket thickness is adjustable, such that the compression ratio of the GDL can be changed by changing the gasket thickness, thereby simulating the corrosion resistance of the GDL under different assembly pressures.

A pulse valve is provided at the inlet of the corrosive liquid, so as to simulate a non-steady flow under an operating condition of a fuel cell.

Figure 1:
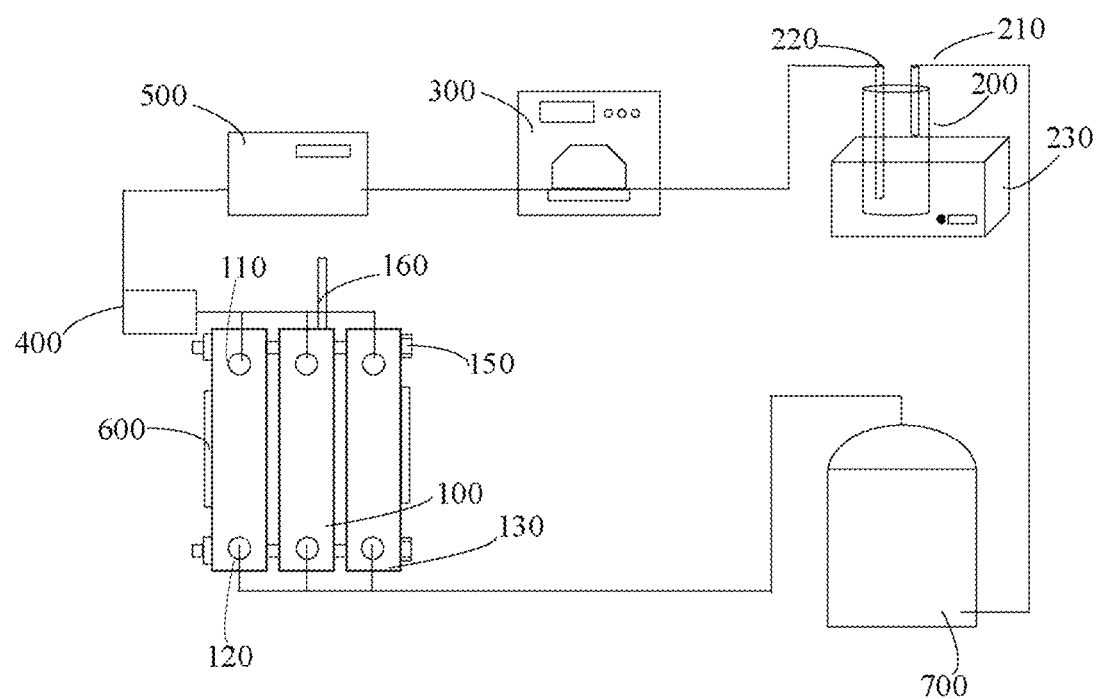
FIG. 1 is a structural diagram of a system for testing durability of a gas diffusion layer (GDL) in accordance with an embodiment of the present disclosure.

In the drawings, 100. clamping component; 110. first water inlet; 120. first water outlet; 130. clamping plate; 141. front end plate; 142. first middle plate; 143. second middle plate; 144. third middle plate; 145. fourth middle plate; 146. fifth middle plate; 147. sixth middle plate; 148. seventh middle plate; 149. eighth middle plate; 1410. ninth middle plate; 1411. rear end plate; 140. positioning hole; 150. screw; 160. thermocouple; 170. gasket; 200. liquid storage tank; 210. second water inlet; 220. second water outlet; 230. water bath; 300. peristaltic pump; 400. float-type flowmeter; 500. pulse valve; 600. heating component; 700. filtering tank; and 800. GDL.

DETAILED DESCRIPTION OF EMBODIMENTS

In order to better illustrate the objects, technical solutions and advantages of the present disclosure, the present disclosure will be further described below in conjunction with the embodiments.

In the present disclosure, unless otherwise specified, the test methods are all conventional methods. Materials and reagents used herein are all commercially available unless otherwise specified.

As shown in FIG. 1, a system for testing durability of a gas diffusion layer (GDL) is provided, which includes a clamping component 100, a liquid storage tank 200 and a peristaltic pump 300. The clamping component 100 is configured to fix the GDL 800. The liquid storage tank 200 is configured to store a corrosive liquid. The peristaltic pump 300 is arranged between the clamping component 100 and the liquid storage tank 200. The peristaltic pump 300 is connected to the clamping component 100 via a first pipeline, and is connected to the liquid storage tank 200 via a second pipeline.

The peristaltic pump 300 is configured to be turned on to pump the corrosive liquid from the liquid storage tank 200 into the clamping component 100, so as to perform erosion-corrosion on the GDL 800.

In an embodiment, a water bath 230 is provided outside the liquid storage tank 200.

Figure 2:
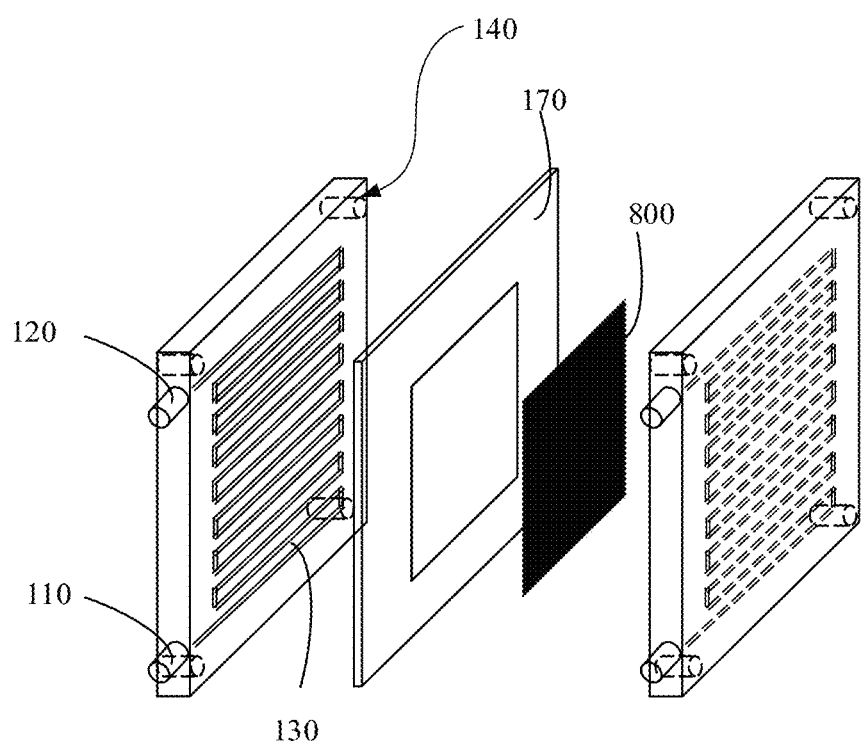
FIG. 2 is a structural diagram of a clamping component in accordance with an embodiment of the present disclosure.

Referring to FIG. 2, the clamping component 100 includes a plurality of clamping plates 130 arranged in parallel. A middle of the clamping component 100 is provided with a flow channel. Both ends of the clamping component 100 are channel-free. The GDL 800 is provided between two adjacent clamping plates among the plurality of clamping plates 130. Each of the plurality of clamping plates 130 is provided with a first water inlet 110 and a first water outlet 120. The first water inlet 110 is connected to the first pipeline, and the first water outlet 120 is connected to a third pipeline connected to the liquid storage tank. The first water inlet 110 and the first water outlet 120 are configured such that the corrosive liquid enters the flow channel through the first water inlet 110 to perform the erosion-corrosion on the GDL 800, and flows back to the liquid storage tank 200 through the first water outlet 120.

Specifically, a filtering tank 700 is provided between a second water inlet 210 of the liquid storage tank 200 and the first water outlet 120. The corrosive liquid from the clamping component 100 passes through the filtering tank 700 for removing impurity and then flows back to the liquid storage tank 200.

A front end of the first water inlet 110 is connected to a float-type flowmeter 400 and a pulse valve 500 in sequence. The pulse valve 500 is connected to the peristaltic pump 300.

Specifically, the float-type flowmeter 400 is configured to accurately measure a flow rate of a water inflow.

The pulse valve 500 (optionally opened) is configured to simulate a non-uniform flow under an operating condition of a fuel cell.

The plurality of clamping plates 130 have the same size, and are each provided with a positioning hole 140 at the same position. The plurality of clamping plates 130 are configured to be fixed via a screw 150 passing through the positioning hole 140. A heating component 600 is provided on an outer side of the clamping component 100. In an embodiment, the heating component 600 is arranged on an outer side of an outermost clamping plate among the plurality of clamping plates 130. In an embodiment, the heating component 600 is a heating sheet.

Referring to FIG. 1, a thermocouple 160 is provided inside the plurality of clamping plates 130, and is configured to measure an internal temperature of the clamping component 100 (0-100° C.).

In an embodiment, the plurality of clamping plates 130 incudes a combination of at least two of a blind plate without flow channels on both side surfaces, an end plate with a flow channel on one side surface, and a middle plate with flow channels on both side surfaces. The flow channels are configured such that the liquid in each flow channel flows independently.

In an embodiment, the flow channel is a serpentine groove, a parallel in-line groove, a wave-shaped groove or a dot-matrix groove. When flushing the GDL, the GDL is in fit with the groove, and the corrosive liquid flows through the groove to flush the GDL.

In an embodiment, the plurality of clamping plates 130 are configured as a combination of an end plate and a blind plate. A flow-channel side surface of the end plate is opposite to the blind plate, with a GDL 800 sandwiched therebetween. A microporous-layer side surface of the GDL 800 is opposite to the flow-channel side surface of the end plate, such that the microporous layer of the GDL 800 can be independently flushed.

In an embodiment, the plurality of clamping plates 130 are configured as a combination of two end plates and at least one middle plate. The at least one middle plate is located between the flow-channel side surfaces of the two end plates. The GDL 800 is sandwiched between the middle plate and the end plate, so as to simultaneously perform the erosion-corrosion on a microporous layer and a backing layer of the GDL 800.

In an embodiment, the GDL 800 is arranged at a middle of the flow-channel plate, and a gasket 170 is provided around the GDL 800 for sealing. A thickness of the gasket 170 is adjustable, such that the compression ratio of the GDL 800 can be adjusted by changing the thickness of the gasket 170, thereby simulating the pressure environment of the GDL 800 when assembled into a fuel cell. In some embodiments, the thickness of the gasket 170 is 100-240 μm, and the gasket 170 is made of polytetrafluoroethylene (PTFE).

In an embodiment, the corrosive liquid is selected from the group consisting of water, Fenton's reagent, ethanol, acetone, hydrogen peroxide, sulfuric acid, hydrochloric acid, nitric acid, sodium hydroxide and a combination thereof.

In an embodiment, the liquid storage tank 200 includes a blue-capped mobile phase bottle with a height of 100-300 mm.

A method for testing GDL durability using the above system is also provided, which includes the following steps.

Step (1) A plurality of GDLs 800 are provided. The plurality of GDLs are identical to each other.

Step (2) The plurality of GDLs 800 are respectively clamped between the plurality of clamping plates 130.

Step (3) The peristaltic pump 300 is turned on to perform erosion-corrosion on the plurality of GDLs 800. N GDLs among the plurality of GDLs are taken out every M days.

Step (4) The physical and chemical parameters of the plurality of GDLs and an uncorroded GDL are determined.

The physical and chemical parameters include planar conductivity, machine-direction (MD) stiffness and weight loss rate.

Embodiment 1

Figure 3:
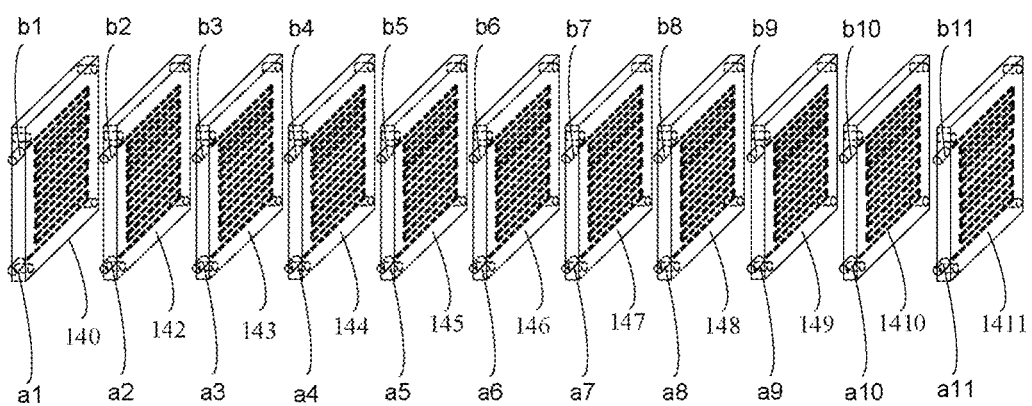
FIG. 3 is a structural diagram of a clamping component in accordance with Embodiment 1 of the present disclosure.

Referring to FIG. 3, a clamping component 100 is provided. Clamping plates 130 of the clamping component 100 are respectively a front end plate 141, a first middle plate 142, a second middle plate 143, a third middle plate 144, a fourth middle plate 145, a fifth middle plate 146, a sixth middle plate 147, a seventh middle plate 148, an eighth middle plate 149, a ninth middle plate 1410 and a rear end plate 1411.

The front end plate 141 is provided with a water inlet a1 and a water outlet b1.

The first middle plate 142 is provided with a water inlet a2 and a water outlet b2.

The second middle plate 143 is provided with a water inlet a3 and a water outlet b3.

The third middle plate 144 is provided with a water inlet a4 and a water outlet b4.

The fourth middle plate 145 is provided with a water inlet a5 and a water outlet b5.

The fifth middle plate 146 is provided with a water inlet a6 and a water outlet b6.

The sixth middle plate 147 is provided with a water inlet a7 and a water outlet b7.

The seventh middle plate 148 is provided with a water inlet a8 and a water outlet b8.

The eighth middle plate 149 is provided with a water inlet a9 and a water outlet b9.

The ninth middle plate 1410 is provided with a water inlet a10 and a water outlet b10.

The rear end plate 1411 is provided with a water inlet a11 and a water outlet b11.

The water inlets and the water outlets are all ⅛ thread to ¼ quick plugs.

The flow channels of the plates are all arranged in parallel.

All GDLs 800 are the same in model, and have a thickness of 200 μm.

All screws 150 are M5 screws with a torque of 10 N·m.

A thickness of a PTFE gasket 170 is 140 μm (the thickness of the gasket should be less than that of the GDLs 800).

The liquid pipelines are ¼-PTFE hard pipes. The pipe at the peristaltic pump 300 is a silicone hose (hose interface 1:1, inner diameter 4.8 mm and wall thickness 1.6 mm), and a hard pipe-hose joint is a ¼ quick-plug to pagoda joint.

The peristaltic pump 300 is a Baoding Qili® BT100-02 driver with a YZ1515 pump head, and has a rotation speed of 100 rpm. A main path of the peristaltic pump 300 adopts a first 1:11 liquid distribution row with 11 branches for supplying the 11 water inlets.

The return water from the 11 water outlets is converged into a single path through a second 1:11 liquid distribution row and returned to the liquid storage tank 200.

The liquid storage tank 200 is a blue-capped mobile phase bottle. The blue-capped mobile phase bottle has a height of 100-300 mm, such as 250 mm. The blue-capped mobile phase bottle has a diameter of 50-150 mm, such as 100 mm. A cap of the blue-capped mobile phase bottle has a first water inlet 110 and a first water outlet 120. The first water outlet 120 extends inwardly to a bottom of the blue-capped mobile phase bottle by means of a hose, and the first water inlet 110 extends inwardly above a liquid level by means of a hose.

S100. 10 GDL samples are cut using a GDL special cutting machine.

S200. 500 mL of a Fenton's reagent is prepared as a corrosive liquid. The corrosive liquid is loaded into the liquid storage tank 200. The 10 GDL samples are respectively clamped between the clamping component 100, where one GDL sample is clamped between every two adjacent clamping plates 130. The specific clamping conditions are described as follows.

Sample No. 1 is clamped between the front end plate 141 and the first middle plate 142.

Sample No. 2 is clamped between the first middle plate 142 and the second middle plate 143.

Sample No. 3 is clamped between the second middle plate 143 and the third middle plate 144.

Sample No. 4 is clamped between the third middle plate 144 and the fourth middle plate 145.

Sample No. 5 is clamped between the fourth middle plate 145 and the fifth middle plate 146.

Sample No. 6 is clamped between the fifth middle plate 146 and the sixth middle plate 147.

Sample No. 7 is clamped between the sixth middle plate 147 and the seventh middle plate 148.

Sample No. 8 is clamped between the seventh middle plate 148 and the eighth middle plate 149.

Sample No. 9 is clamped between the eighth middle plate 149 and the ninth middle plate 1410.

Sample No. 10 is clamped between the ninth middle plate 1410 and the rear end plate 1411.

The 10 GDL samples are in one-to-one correspondence with the gaskets, and a ratio of the gasket thickness to the GDL thickness is the assembly compression ratio of the GDL.

S300. The liquid storage tank 200 is placed in the water bath 230 at 80° C. The water inlet and the water outlet of each of the clamping plates 130 are respectively connected by means of hoses. The peristaltic pump 300 is connected to the liquid storage tank 200. The peristaltic pump 300 is turned on to pump the corrosive liquid, so that the entire corrosive liquid forms a circulating loop.

S400. One sample was taken out every other day, rinsed with deionized water and dried at 100° C. After 10 days, all of the 10 GDL samples are taken out and determined for physical and chemical parameters, including weight loss rate (with the results shown in FIG. 4), surface resistivity (with the results shown in FIG. 5), and MD direction stiffness (with the results shown in FIG. 6).

Figure 4:
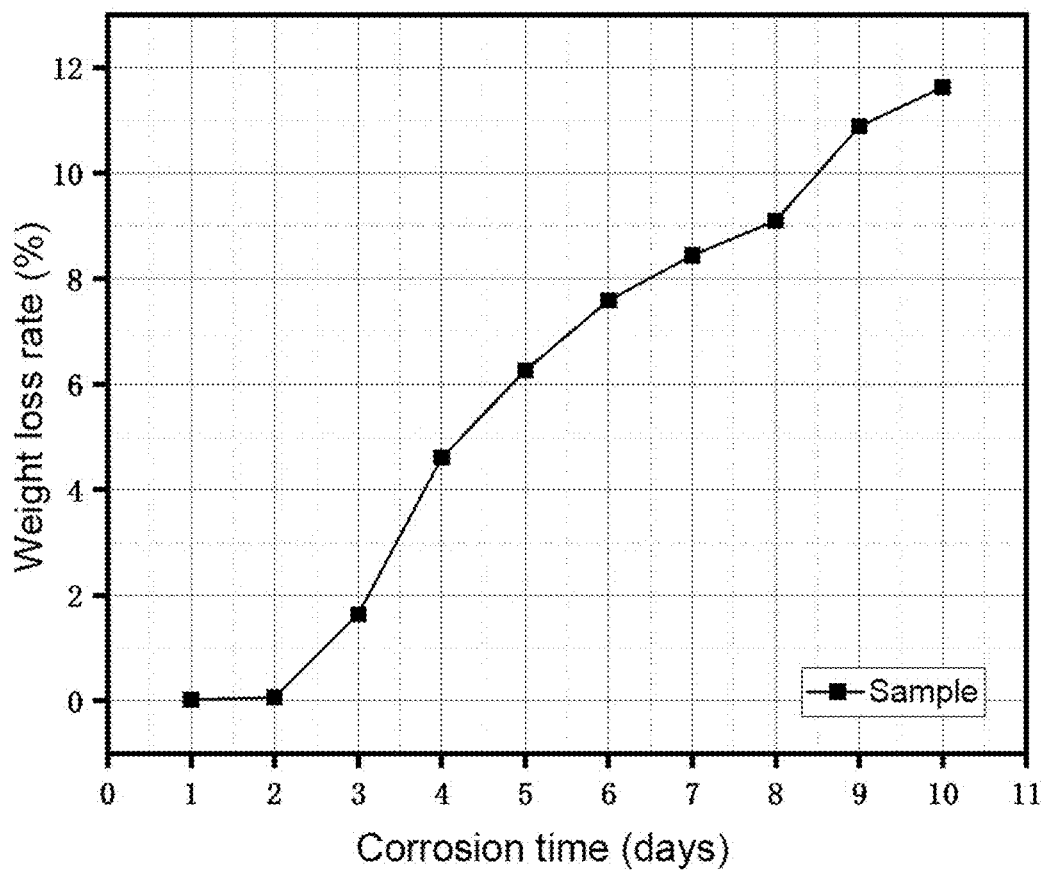
FIG. 4 shows weight loss rate of the GDL in accordance with an embodiment of the present disclosure.

As shown in FIG. 4, both side surfaces of the GDL are subjected to erosion-corrosion for 10 days using the Fenton's reagent. As the corrosion time increases, the material weight loss continuously increases. This is because the graphite filled on the backing layer and the carbon black on the microporous layer fall off under chemical corrosion and are lost under mechanical erosion of the water flow.

Figure 5:
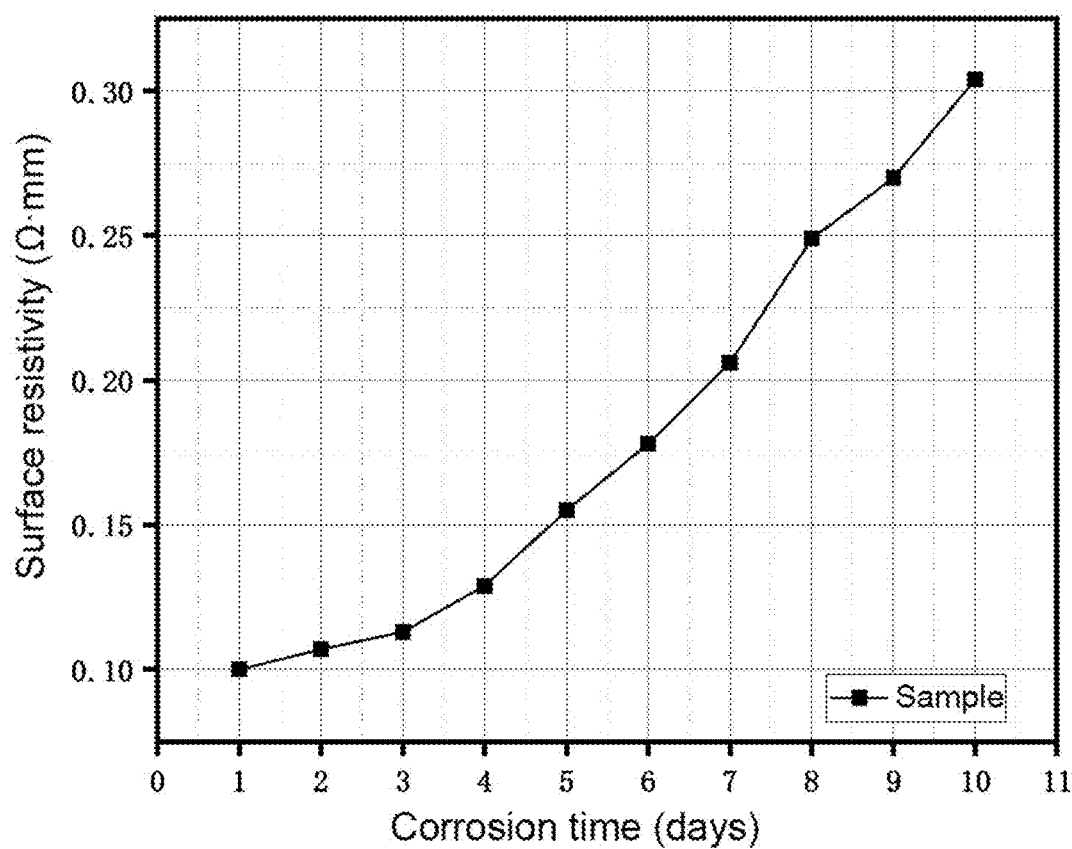
FIG. 5 shows surface resistivity of the GDL in accordance with an embodiment of the present disclosure.

As shown in FIG. 5, as the corrosion time increases, the surface resistivity of the GDL continuously increases. This may be because an important part of the GDL for conductivity, i.e., the graphite filled on the backing layer, falls off under chemical corrosion and is lost under the mechanical erosion of the water flow.

Figure 6:
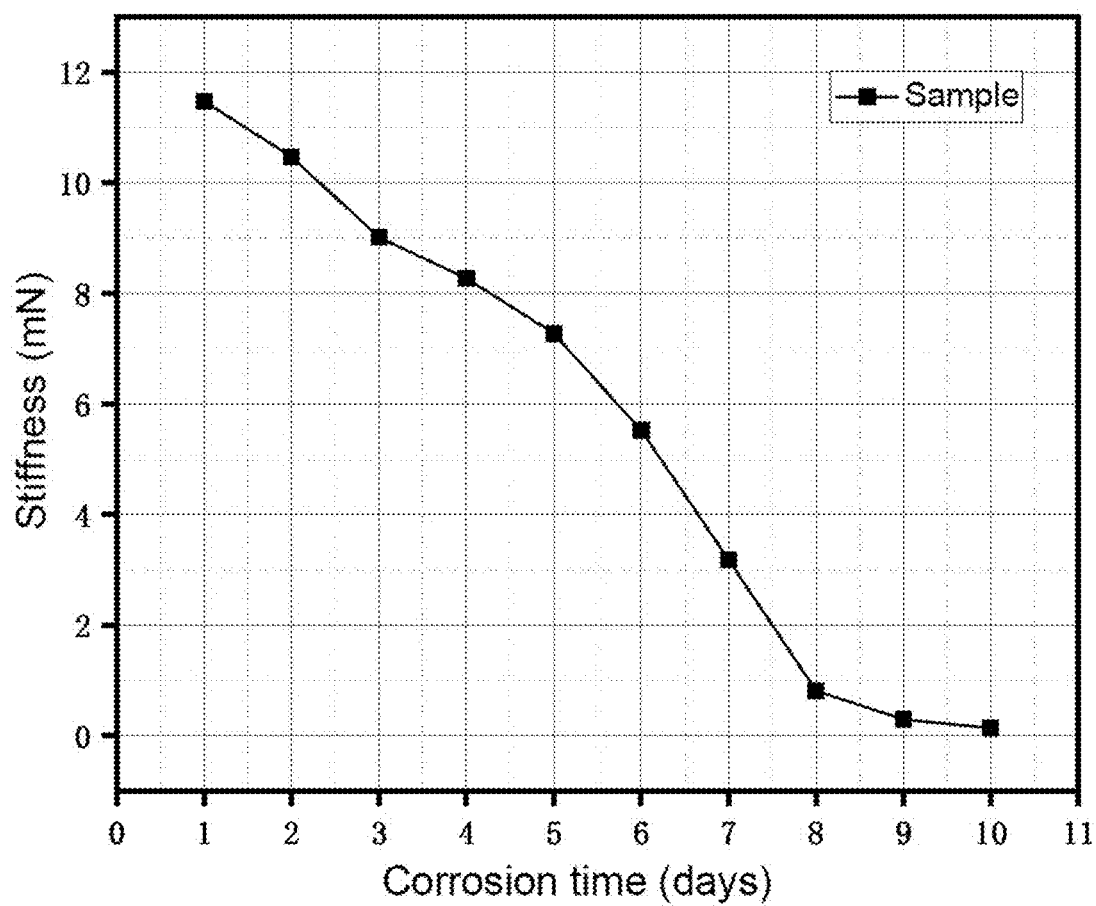
FIG. 6 shows machine-direction (MD) stiffness of the GDL in accordance with an embodiment of the present disclosure.

As shown in FIG. 6, with the increase of corrosion time, the bending stiffness of the GDL continuously decreases until it almost loses stiffness on the tenth day, which is due to the loss of bonded carbon among the carbon fibers under chemical corrosion and mechanical stress, and insufficient bonding force among the carbon fibers, resulting in a significant decrease in the bending stiffness of the material.

It should be noted that the specific parameters or some reagents in the embodiments are merely illustrative, and are not intended to limit the present disclosure. It should be understood that various modifications or replacements made by those skilled in the art without departing from the spirit of the disclosure shall fall within the scope of the present disclosure defined by the appended claims.

What is claimed is:

1. A system for testing durability of a gas diffusion layer (GDL), comprising:
   a clamping component;
   a liquid storage tank; and
   a peristaltic pump;
   wherein the clamping component is configured to fix the GDL, a middle of the clamping component is provided with a flow channel, and both ends of the clamping component are channel-free;
   the liquid storage tank is configured to store a corrosive liquid;
   the peristaltic pump is arranged between the clamping component and the liquid storage tank; and the peristaltic pump is connected to the clamping component via a first pipeline, and is connected to the liquid storage tank via a second pipeline;
   the peristaltic pump is configured to be turned on to pump the corrosive liquid from the liquid storage tank into the clamping component during testing, so as to perform erosion-corrosion on the GDL;
   the clamping component comprises a plurality of clamping plates arranged in parallel;
   the GDL is located between two adjacent clamping plates among the plurality of clamping plates; each of the plurality of clamping plates is provided with a water inlet and a water outlet; the water inlet is connected to the first pipeline, and the water outlet is connected to a third pipeline connected to the liquid storage tank; and the water inlet and the water outlet are configured such that the corrosive liquid enters the flow channel through the water inlet to perform the erosion-corrosion on the GDL, and flows back to the liquid storage tank through the water outlet;
   the plurality of clamping plates comprise two end plates with one flow-channel side surface and at least one middle plate with two flow-channel side surfaces;
   the at least one middle plate is located between the flow-channel side surfaces of the two end plates;
   the GDL is configured to be tested for physical and chemical parameters, wherein the physical and chemical parameters comprise planar conductivity, machine-direction (MD) stiffness and weight loss rate; and
   an end of the water inlet is connected to a float-type flowmeter and a pulse valve in sequence, and the pulse valve is connected to the peristaltic pump.

2. The system of claim 1, wherein the plurality of clamping plates have the same size, and are each provided with a positioning hole at the same position; and the plurality of clamping plates are configured to be fixed via a screw passing through the positioning hole.

3. The system of claim 1, wherein a gasket is provided around the GDL for sealing.

4. The system of claim 1, wherein the corrosive liquid is selected from the group consisting of water, Fenton's reagent, ethanol, acetone, hydrogen peroxide, sulfuric acid, hydrochloric acid, nitric acid, sodium hydroxide and a combination thereof.

5. The system of claim 1, wherein the liquid storage tank comprises a blue-capped mobile phase bottle with a height of 100-300 mm.

6. A system for testing durability of a GDL, comprising:
   a clamping component;
   a liquid storage tank; and
   a peristaltic pump;
   wherein the clamping component is configured to fix the GDL, a middle of the clamping component is provided with a flow channel, and both ends of the clamping component are channel-free;
   the liquid storage tank is configured to store a corrosive liquid;
   the peristaltic pump is arranged between the clamping component and the liquid storage tank; and the peristaltic pump is connected to the clamping component via a first pipeline, and is connected to the liquid storage tank via a second pipeline;
   the peristaltic pump is configured to be turned on to pump the corrosive liquid from the liquid storage tank into the clamping component during testing, so as to perform erosion-corrosion on the GDL;
   the clamping component comprises a plurality of clamping plates arranged in parallel;

the GDL is located between two adjacent clamping plates among the plurality of clamping plates; each of the plurality of clamping plates is provided with a water inlet and a water outlet; the water inlet is connected to the first pipeline, and the water outlet is connected to a third pipeline connected to the liquid storage tank; and the water inlet and the water outlet are configured such that the corrosive liquid enters the flow channel through the water inlet to perform the erosion-corrosion on the GDL, and flows back to the liquid storage tank through the water outlet;

the plurality of clamping plates comprise two end plates with one flow-channel side surface and at least one middle plate with two flow-channel side surfaces;

the at least one middle plate is located between the flow-channel side surfaces of the two end plates;

the GDL is configured to be tested for physical and chemical parameters, wherein the physical and chemical parameters comprise planar conductivity, machine-direction (MD) stiffness and weight loss rate; and a heating component is provided on an outer side of the clamping component.

7. A method for testing GDL durability using a system for testing durability of a GDL, the system comprising:

a clamping component;

a liquid storage tank; and a peristaltic pump;

wherein the clamping component is configured to fix the GDL, a middle of the clamping component is provided with a flow channel, and both ends of the clamping component are channel-free;

the liquid storage tank is configured to store a corrosive liquid;

the peristaltic pump is arranged between the clamping component and the liquid storage tank; and the peristaltic pump is connected to the clamping component via a first pipeline, and is connected to the liquid storage tank via a second pipeline;

the peristaltic pump is configured to be turned on to pump the corrosive liquid from the liquid storage tank into the clamping component during testing, so as to perform erosion-corrosion on the GDL;

the clamping component comprises a plurality of clamping plates arranged in parallel;

the GDL is located between two adjacent clamping plates among the plurality of clamping plates; each of the plurality of clamping plates is provided with a water inlet and a water outlet; the water inlet is connected to the first pipeline, and the water outlet is connected to a third pipeline connected to the liquid storage tank; and the water inlet and the water outlet are configured such that the corrosive liquid enters the flow channel through the water inlet to perform the erosion-corrosion on the GDL, and flows back to the liquid storage tank through the water outlet;

the plurality of clamping plates comprise two end plates with one flow-channel side surface and at least one middle plate with two flow-channel side surfaces;

the at least one middle plate is located between the flow-channel side surfaces of the two end plates; and the GDL is configured to be tested for physical and chemical parameters, wherein the physical and chemical parameters comprise planar conductivity, machine-direction (MD) stiffness and weight loss rate;

the method comprising:

(1) providing a plurality of GDLs, wherein the plurality of GDLs are identical to each other;

(2) respectively clamping the plurality of GDLs between the plurality of clamping plates;

(3) turning on the peristaltic pump to perform erosion-corrosion on the plurality of GDLs, and taking out N GDLs among the plurality of GDLs every M days; and (4) determining the physical and chemical parameters of the plurality of GDLs and an uncorroded GDL.

\* \* \* \* \*